J. G. BAUKAT.
CONTROLLING MEANS FOR POWER TRANSMISSION.
APPLICATION FILED DEC. 9, 1916.
1,239,252.
Patented Sept. 4, 1917.
3 SHEETS—SHEET 1.
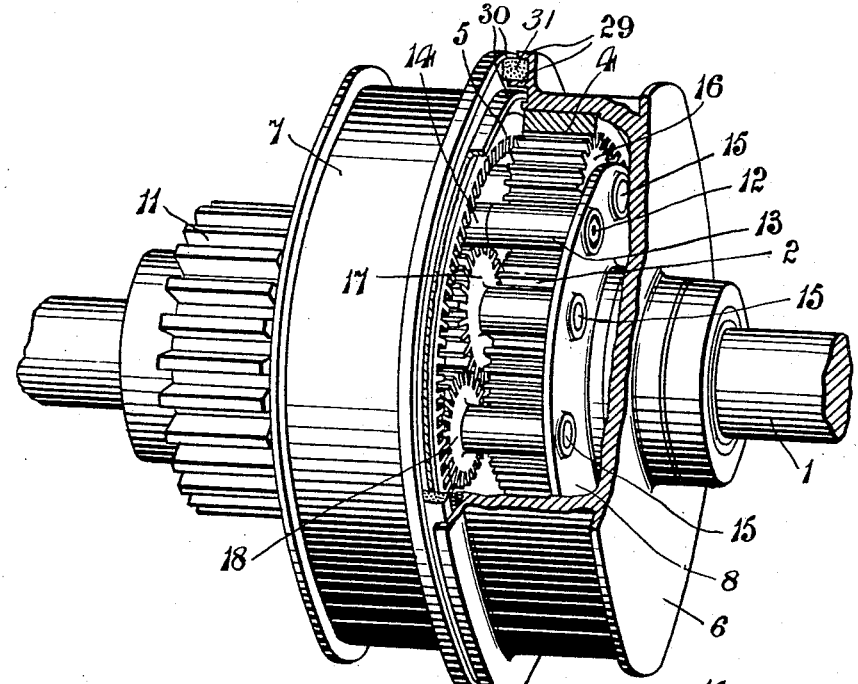
Fig. 1.
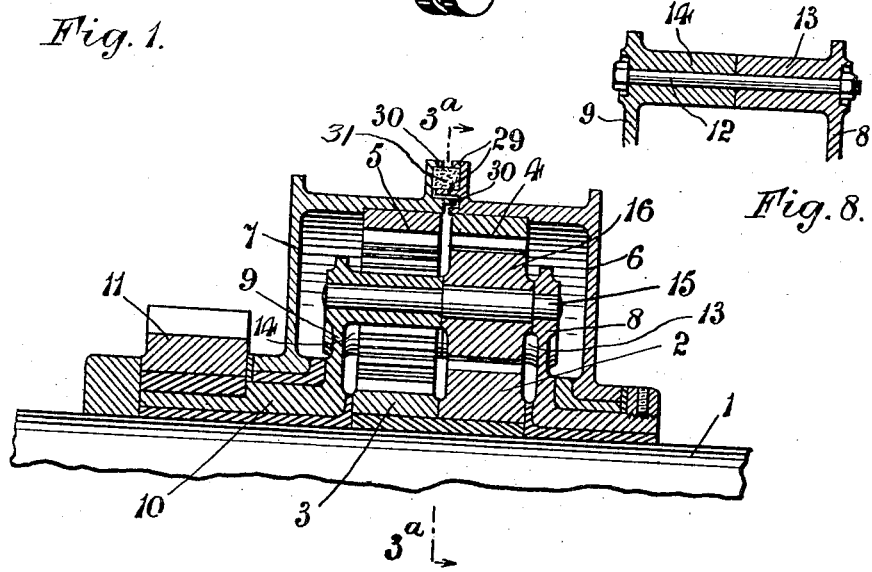
Fig. 2.
Fig. 8.
Inventor:
JOHN G. BAUKAT
By
Stanley Lightfoot
Attorney.

J. G. BAUKAT.
CONTROLLING MEANS FOR POWER TRANSMISSION.
APPLICATION FILED DEC. 9, 1916.

1,239,252.

Patented Sept. 4, 1917.
3 SHEETS—SHEET 2.

Inventor:
JOHN G. BAUKAT
By Stanley Lightfoot.
ATTORNEY.

J. G. BAUKAT.
CONTROLLING MEANS FOR POWER TRANSMISSION.
APPLICATION FILED DEC. 9, 1916.
1,239,252.
Patented Sept. 4, 1917.
3 SHEETS—SHEET 3.
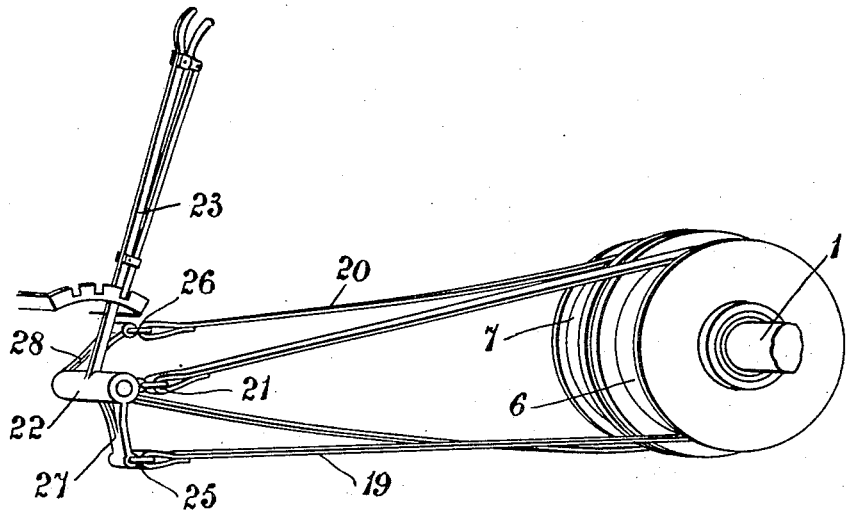
Fig. 5.
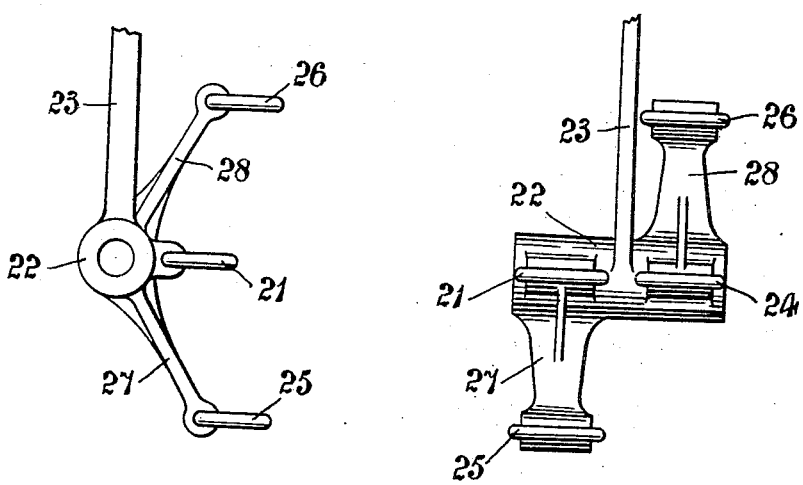
Fig. 6.
Fig. 7.
Inventor:
John G. Baukat
By Stanley Lightfoot
Attorney

UNITED STATES PATENT OFFICE.

JOHN G. BAUKAT, OF TORONTO, ONTARIO, CANADA.

CONTROLLING MEANS FOR POWER TRANSMISSION.

1,239,252.           Specification of Letters Patent.          Patented Sept. 4, 1917.

Application filed December 9, 1916. Serial No. 136,042.

*To all whom it may concern:*

Be it known that I, JOHN G. BAUKAT, of the city of Toronto, in the county of York, in the Province of Ontario, in the Dominion of Canada, mechanical engineer, have invented certain new and useful Improvements in Controlling Means for Power Transmission, and do hereby declare that the following is a full, clear, and exact description of same.

This invention relates to controlling means for power transmission of the type involving gearing, either frictional or positive, through the medium of which gearing power may be transmitted from a driving member, such as a shaft, to a driven member, such as a pulley or sprocket wheel; and more particularly relates further to the application of clutch mechanism and gearing in combination to secure both a "forward" and a "reverse" action of the said driven member at the will of the operator; the object of the said invention being to provide a controlling means for power transmission of a construction, and subject to a method of operation, which will permit the control of the forward or reverse motion of the driven member to be incidental to the method of application of the clutch.

It is also an object of the said invention to provide for the inclosing of the trains of gears, forming the forward and reverse gears, in a protective manner, the said inclosing members being actually operative and controlling parts of the device; an incidental object, which is also effected by novel construction, such as hereinafter described, being to eliminate to a great extent the use of supporting and other parts, not actually operative in themselves or subject to operation, thus permitting mechanical simplicity.

A further object is the provision of coacting members supporting opposite ends of pinion spindles whereby stresses upon the said spindles are reduced to a minimum, and motion may be transmitted through said spindles from said pinions to said supporting members for the purposes hereinafter described.

Still further, objects are to provide a duplex clutch mechanism of a nature which will admit of the release of a "forward" element of said clutch relative to the operative application of a "reverse" element, or vice versa, but permitting of a neutral position of the parts; and to effect the elimination of sliding or positive mechanically engaging and disengaging parts to effect a gear change.

Further objects subsidiary to or resulting from the hereinbefore mentioned objects, or from the novel construction and arrangement of parts of the invention as it may be carried into effect, will become apparent as the invention is further disclosed in the specification.

To carry the invention into effect, I may provide, as an example, a dual clutch member in the form of two drums, each open on their opposing sides in such manner that in their relative positions they form an inclosed chamber within which trains of gears are located, and through which the driving shaft passes, the said drums being freely mounted around said shaft whereby said shaft may not directly transmit motion to said drums. Each of the said drums has secured thereto an internal gear, and said shaft has a pair of central gears rigidly mounted thereon corresponding with the said internal gears, and adapted to operate the same through the medium of one or more intermediate pinions, it being proposed to provide such gear trains operating between the internal gears and their respective central gears as would produce, in one case, a corresponding rotation of the internal gear to the central gear, and, in the other case, an opposite movement of the internal gear to its central gear, presuming the axes of the pinions to be stationary, upon the well-known planetary principle; and means are also provided to control the movement or otherwise of the axes of the said pinions. These means are thought to be novel and involve the use of a supporting member or supporting members carrying the spindles upon which the pinions are mounted, the said supporting members being rotatably mounted upon the said driving shaft and adapted to be rotated thereby through the medium of certain of said pinions, as a result of the planetary movement of such pinions around their respective central gear, which movement is permitted or prevented by the freedom or inability, as the case may be, of the corresponding internal gear to rotate. The rotation of the internal gears is, of course, subject to the rotation of the drums to which they are fixed, and means, preferably frictional, are provided whereby one or other of said drums may be secured against rotation, in such manner that the release of one drum will precede the securing of the other of said drums whereby both drums may be free, but may not be secured against rotation at one and the same time. By these means the selective securing of one or other of said drums will operate both to control the extent of power transmission and the direction of such transmission, as will be more particularly described and ascertained in and by the following specification having reference to the accompanying drawings, in which:—

Figure 1 is a perspective view, partly broken away, of the gear inclosing device mounted upon a driving shaft.

Fig. 2 is a sectional elevation of the same, the lower half being broken away.

Fig. 5 is a perspective view of the complete device, showing a desirable operating means.

Fig. 6 is a side elevation of the lower end of the operating lever.

Fig. 7 is a front view of the same, and

Fig. 8 is a detail view of the connection, between the opposed supporting disks.

Similar characters of reference indicate similar parts in the several figures of the drawings.

Figure 3:
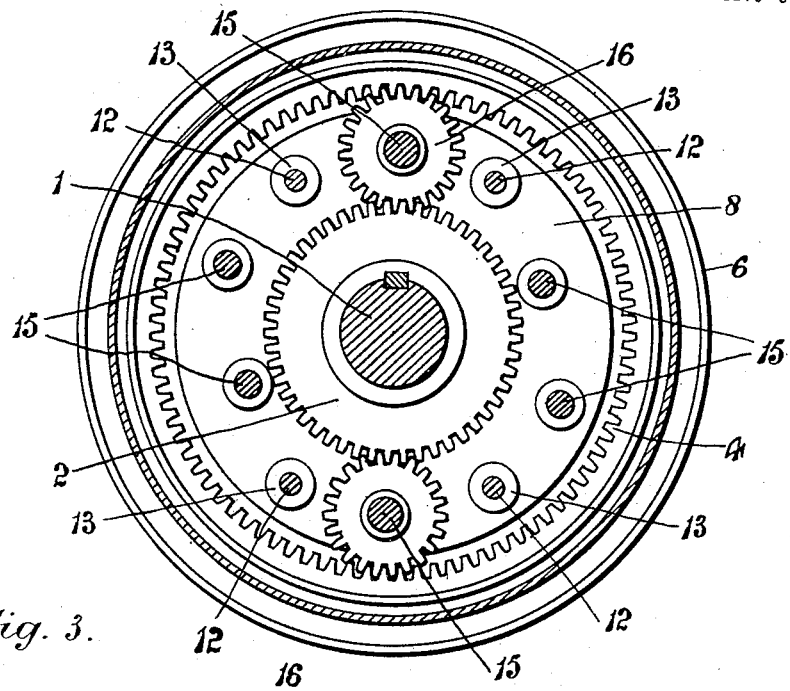
Fig. 3 is a transverse section in the line 3ª—3ª, Fig. 2 looking in the direction of the arrows.
Figure 4:
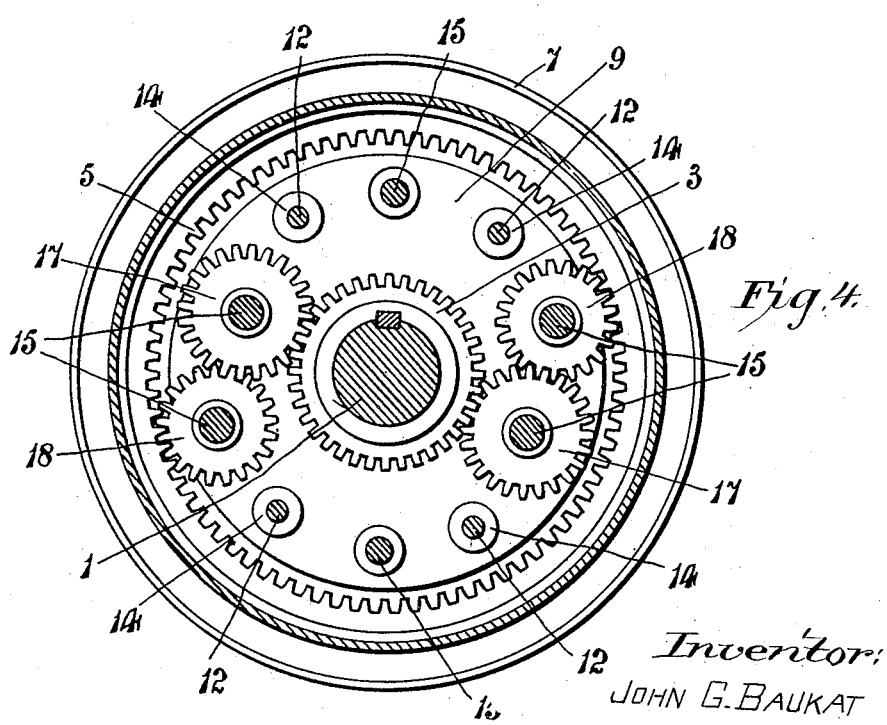
Fig. 4 is a section on the said line 3ª—3ª, but looking in the opposite direction.

In the example illustrated a driving shaft 1 is shown having fixedly mounted thereon gears 2 and 3, which will hereinafter be referred to as the central forward and reverse gears, respectively, and coresponding with each of these said central gears, are internal gears 4 and 5, carried by and movable with drums 6 and 7, which drums are open on their opposed sides, as shown, together forming an inclosed chamber around the said shaft 1, each of said drums being controllable to rotate with, or remain stationary irrespective of the rotation of said shaft.

8 and 9 are pinion supporting members in the form of disks, also loosely mounted upon the said shaft 1, one of said members having a sleeve 10 extending therefrom, through the end wall of the drum inclosing said member, in this case the drum 7, a spur wheel 11 being mounted on the said sleeve 10 and rotatable therewith to drive the machine or such other device with which the invention is to be used.

The supporting members 8 and 9 are connected together by bolts 12, 12, and are spaced by distance pieces 13, 13, 14, 14, and carry a series of spindles 15, 15 upon which are mounted pinnions 16, 16, 17, 17 and 18, 18, the pinions 16 and 17 engaging with the central gears 2 and 3, respectively, and the said pinions 16 also engaging with the internal gear 4, while the said pinions 18 engage with the said pinions 17 and with the internal gear 5. It will, therefore, be readily understood that, lacking any external influence, the whole mechanism mounted upon the shaft 1 would rotate as a whole therewith, but, as in use the spur wheel would be normally held, against rotation, by the frictional resistance and inertia of the mechanism with which it is connected, the supporting members would remain stationary with the result that the pinions would revolve upon their spindles and cause the drum 6 to rotate in an opposite direction to the said shaft 1, and the drum 7 to rotate in the same direction as the said shaft, but at a lower velocity than the said drum 6, where the central gear 3 is smaller than the gear 2, as in the construction illustrated.

It naturally follows, that in the event of the securing of the drum 6 against rotation, this will result in the said pinions 16, 16 traveling within the internal gear 4, and thus rotating the supporting members 8 and 9 and incidentally the spur wheel 11, in the same direction as at the said shaft 1, by virtue of the connection of said spur wheel 11 with the said member 9 through the medium of the sleeve 10. Similarly, the securing of the drum 7 against rotation, will result in the traveling of the pinions 18, 18 within the internal gear 5, but in an opposite direction to that hereinbefore ascribed to the pinions 16, 16, owing to the said pinions 18, 18 being indirectly geared with the central gear 3 through the medium of the pinions 17, 17, so that a reverse movement to that of the shaft 1, is transmitted to the said spur wheel 11 through the supporting member 9 and sleeve 10.

In order to determine the securing of one or other of said drums to a nicety and to provide for flexibility in such control, while permitting freedom of movement in said drums, when necessary or desirable, it is proposed to provide brakes of a preferably frictional character to operate in such manner that one of said brakes will become operative subsequent to the other of said brakes having been rendered inoperative, the intermediate stage allowing the general freedom of movement of the said drums hereinbefore referred to.

In the drawings, this is shown as being accomplished by belts 19 and 20 extending over the drums 6 and 7, respectively, the upper end of the said belt 19 being connected to a link 21 extending from the boss 22 of a lever 23 and the lower end of the said belt 20 connected to a similar link 24 extending from the said boss 22. The lower and upper ends, respectively, of the said belts 19 and 20 are connected to links 25 and 26 carried by arms 27 and 28 extending substantially from the said boss 22, of the said lever, in such relation that movement of the said lever will result in a like movement of one of said arms toward said drums, and the movement of the other of said arms away from said drums, the movement of the links 21 and 24 being negligible. Thus, in the construction shown in the drawings, a forward movement of the said lever 23 toward the drums effects a similar movement of the said arm 28 and consequent relaxing of the said belt 20, while the movement of the arm 27 brings the belt 20 into tension binding the same upon the drum 6, preventing the rotation of the said drum with the said shaft 1, and causing the forward operation of the spur gear 11 as already described. The partial rearward movement of the said lever 23 may be effected to an extent sufficient to relax the said belt 19 without necessarily bringing the said belt 20 into a state of tension, and thus the free movement of both the drums may be permitted, but the further rearward movement of the said lever will effectually tighten the said belt 20 upon the said drum 7 and result in the reverse rotation of the said spur wheel 11.

31 is an annular packing arranged between the adjacent edges of the said drums 6 and 7, the said edges having annular flanges 29, 29 and 30, 30 thereon to form a chamber to accommodate the said packing.

It will be seen that the simple control of the transmission of power, in volume and direction, may be effected by a single lever or operating member with great precision and flexibility, and as all the stages of the operation are resultant merely upon frictional resistance, danger of breakage of the mechanism due to overload or obstruction is reduced to a minimum.

Also, the total elimination of positive sliding engaging members or similar positive devices eliminates the necessity of overcoming inertia and useless friction in such sliding parts to change the direction of transmission while permitting an action free from noise and delay in operation.

This invention may be developed within the scope of the following claims without departing from the essential features of the said invention, and it is desired that the specification and drawings be read as being merely illustrative, and not in a limiting sense, except as necessitated by the prior art.

What I claim as my invention is:

1. In a transmission, a shaft, driving gears secured to said shaft, a sleeve rotatable on said shaft, a pinion on said sleeve, pinions carried by the sleeve and meshing with the driving gears, independently rotatable brake drums on the sleeve housing the pinions, the meeting faces of said drums being grooved, ring gears carried by the brake drums and meshing with the pinions and a packing located in the said grooves of said drums to form an oil and dust proof joint.

2. In a transmission, a shaft, driving gears secured to said shaft in juxtaposition, a collar on said shaft spaced from the gears, a sleeve rotatable on the shaft between the collar and gears, said sleeve being flanged, a gear secured to the sleeve, a second sleeve rotatable on the shaft at the opposite end of the gears, said sleeve being also flanged, axles connecting the flanges, pinions rotatable on the axles and meshing with the gears, a brake drum rotatable on each sleeve housing the pinions, ring gears carried by said drums and meshing with the pinions, a locking collar on the end of the last named sleeve to hold the whole in assembled position, and means to control the rotation of each brake drum.

3. In a transmission, a shaft, driving gears keyed to said shaft in juxtaposition, flanged sleeves on opposite sides of said gears, axles connecting the flanges of said sleeves and bridging said gears, pinions carried by said axles and meshing with said gears, a brake drum rotatable upon each of said sleeves and housing said pinions, ring gears carried by said drums and meshing with said pinions, a gear carried by one of said sleeves exterior to the drum, detachable means locking each of said drums against endwise movement upon their respective sleeves, and means to control the rotation of each brake drum.

4. The combination with a planetary transmission having brake drums, of a control means therefor comprising a sleeve a lever extending laterally from said sleeve to rotate same, means to hold the lever in various positions, an arm extending laterally from said sleeve, near one end, a second arm extending laterally from said sleeve near its opposite end, said arms being disposed at a substantial angle to said first mentioned arm, loops secured to the sleeve in line with the longitudinal axes of the arms, and brake bands connected each at one end to the loops on the sleeve and at the other ends each to an arm, said bands surrounding the brake drums of the transmission whereby when the lever is rocked certain of said drums will be affected.

5. The combination with a planetary transmission having brake drums, of a control means therefor comprising a sleeve a lever extending laterally from said sleeve and arranged centrally thereof, means to hold the lever in various positions, an arm extending laterally from said sleeve, near one end, a second arm extending laterally from said sleeve near its opposite end, said arms extending in opposite directions with relation to each other, loops carried at the ends of the arms, loops secured to the sleeve in line with the longitudinal axes of the arms, and brake bands connected to the loops on the sleeve and arms, said bands surrounding the brake drums of the transmission whereby when the lever is rocked certain of said drums will be affected.

Signed at the city of Toronto, in the county of York in the Province of Ontario, in the Dominion of Canada, this sixth day of December, 1916.

JOHN G. BAUKAT.

Copies of this patent may be obtained for five cents each, by addressing the "Commissioner of Patents, Washington, D. C."